United States Patent
Peng et al.

(10) Patent No.: US 12,091,319 B2
(45) Date of Patent: *Sep. 17, 2024

(54) PROCESS FOR H2 AND SYNGAS PRODUCTION

(71) Applicant: Air Products and Chemicals, Inc., Allentown, PA (US)

(72) Inventors: Xiang-Dong Peng, Lake Mary, FL (US); Yu Zhang, Orefield, PA (US); Tori Dawn Courtney, Phoenixville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,294

(22) Filed: Jun. 21, 2023

(65) Prior Publication Data

US 2023/0331548 A1 Oct. 19, 2023

Related U.S. Application Data (62) Division of application No. 17/407,422, filed on Aug. 20, 2021, now Pat. No. 11,897,769.

(51) Int. Cl.
*C01B 3/38* (2006.01)
*C01B 3/48* (2006.01)
*C01B 3/52* (2006.01)

(52) U.S. Cl.
CPC .............. *C01B 3/382* (2013.01); *C01B 3/48* (2013.01); *C01B 3/52* (2013.01); *C01B 2203/0233* (2013.01); *C01B 2203/0244* (2013.01); *C01B 2203/0283* (2013.01); *C01B 2203/0415* (2013.01); *C01B 2203/0811* (2013.01); *C01B 2203/0833* (2013.01); *C01B 2203/0894* (2013.01); *C01B 2203/1241* (2013.01);

(Continued)

(58) Field of Classification Search
CPC .................. B01J 12/005; B01J 19/0013; B01J 2219/0087; C01B 3/48; C01B 3/52; C01B 2203/0233; C01B 2203/0238; C01B 2203/0283; C01B 2203/0415; C01B 2203/0465; C01B 2203/0883; C01B 2203/0833; C01B 2203/0894

See application file for complete search history.

(56) References Cited

U.S. PATENT DOCUMENTS 3,728,093 A 4/1973 Cofield
4,810,472 A 3/1989 Andrew et al.
(Continued)

FOREIGN PATENT DOCUMENTS

CN 109399563 3/2019
WO 2010109184 9/2010

OTHER PUBLICATIONS

Cotton, Bill, Clean Hydrogen. Part 1: Hydrogen from Natural Gas through Cost Effective CO2 Capture, The Chemical Engineer, Mar. 15, 2019, pp. 1-6, www.thechemicalengineer.com/Features.

*Primary Examiner* — Jafar F Parsa
(74) *Attorney, Agent, or Firm* — Jason M. Ploeger (57) ABSTRACT

A process for producing syngas that uses the syngas product from an oxygen-fired reformer to provide all necessary heating duties, which eliminates the need for a fired heater. Without the flue gas stream leaving a fired heater, all of the carbon dioxide produced by the reforming process is concentrated in the high-pressure syngas stream, allowing essentially complete carbon dioxide capture.

9 Claims, 4 Drawing Sheets

(52) U.S. Cl.
CPC ............... *C01B 2203/1276* (2013.01); *C01B 2203/142* (2013.01); *C01B 2203/146* (2013.01); *C01B 2203/148* (2013.01)

(56) References Cited

U.S. PATENT DOCUMENTS

| | | |
|---|---|---|
| 8,715,617 B2 | 5/2014 | Genkin et al. |
| 2003/0046867 A1 | 3/2003 | Woods et al. |
| 2013/0055637 A1 | 3/2013 | Ariyapadi et al. |
| 2015/0321913 A1 | 11/2015 | Knudsen et al. |
| 2018/0002184 A1 | 1/2018 | Ostuni et al. |
| 2021/0206633 A1 | 7/2021 | Shah et al. |

PROCESS FOR H2 AND SYNGAS PRODUCTION

CROSS REFERENCE TO RELATED APPLICATIONS

This application is a divisional of, and claims the priority of, U.S. patent application Ser. No. 17/407,422 filed Aug. 20, 2021, which is incorporated by reference herein in its entirety.

BACKGROUND

Industrial processes such as reforming hydrocarbon feeds to produce hydrogen and syngas will need to capture carbon dioxide (CO2) to mitigate the effects of climate change. Steam methane reforming (SMR) is the most common reforming technology, but uses air-fired combustion to generate the heat needed to drive the reforming reactions. Air-fired combustion, whether in an SMR or in a fired heater, generates a flue gas in which the CO2 is at low pressure and concentration due to the high amounts of inert nitrogen contributed by the air. Carbon capture from flue gas is costly, inefficient, and bulky. Eliminating air-fired combustion not only makes efficient capture of 100% of the CO2 in the process possible, but it also reduces capital costs by eliminating the need to handle the nitrogen in the air.

Oxygen-fired reforming methods can achieve relatively high carbon capture compared to conventional steam/hydrocarbon reforming methods since a majority of the CO2 produced in the oxygen-fired reforming methods can be recovered from the high pressure syngas stream using conventional acid gas removal operations. Oxygen-fired reforming, like auto-thermal reforming (ATR) and partial oxidation (PDX), produces H2 and/or CO and a lot of excess heat. This heat can be used for process heating and steam generation, and the latter may be exported as a steam product if there is local demand. Optimizing the heat integration for oxygen-fired reforming is therefore a key design consideration.

Genkin et al. (U.S. Pat. No. 8,715,617) teach an ATR-based H2 production process. The syngas heat recovery system in this process includes a recuperative reformer (RR), which is a heat exchanger in which hot syngas provides heat to drive a catalytic reforming reaction. The syngas heat recovery system also includes mixed feed preheating (MFPH) and feed preheating (FPH), two preheating functions normally carried out in a fired heater in the conventional ATR and PDX processes.

However, this process does not have a waste heat boiler (WHB), and the syngas heat recovery system cannot produce enough steam for the process use (i.e., the steam needed for reforming and water gas shift reactions), let alone export steam. A fired boiler is used to supplement the process steam demand. The function of this fired boiler can be replaced by import steam, if available. The process does not have a steam superheater (SSH), which is normally associated with export steam.

A similar ATR based H2 production process is disclosed in the article "Clean Hydrogen: Part 1: Hydrogen from Natural Gas through Cost Effective CO2 Capture", Bill Cotton, The Chemical Engineer, 15 Mar. 2019. Its syngas heat recovery system includes FPH and MPFH. The process is featured by a recuperative reformer known as a gas heated reformer (GHR). A mixed feed is introduced to the tube side of GHR and the raw syngas stream from the ATR is introduced to the shell side of GHR. The mixed feed is partially reformed using the heat from the syngas by heat transfer through the tubes. The partially reformed mixed feed becomes the feed to the ATR and the syngas leaving GHR goes into a heat exchanger to heat the mixed feed (MFPH). This ATR-GHR-MFPH arrangement is aimed at recovering high-grade heat for reforming as much as possible, instead of using the high-grade heat for steam generation in a WHB as in the conventional process (FIG. 1 in Cotton). This arrangement allows the process to achieve the maximum exergy. This maximum exergy approach reforms ~30% of the total hydrocarbon in the feedstock into syngas in GHR. The temperatures of this arrangement can be inferred from U.S. Pat. No. 4,810,471. The raw syngas stream typically enters GHR at 1000 C and leaves GHR at 500 C. The mixed feed typically enters GHR at 400 C and leaves GHR at 700 C. In this ATR-GHR-MFPH arrangement, part of the GHR and part of the MFPH operate within the metal dusting temperature range.

Note that this ATR-GHR-MFPH or maximum exergy arrangement leaves the process without a WHB just as seen in Genkin. Without a WHB, this process also will not be able to produce enough steam for the process needs or export steam. The article is silent about this issue. But this shortage of the process steam needs to be supplemented somehow (e.g., import steam or a fired boiler).

The Cotton process describes a carbon capture efficiency of 95.4% of the CO2, from which we may infer that it does not capture the low pressure flue gas CO2. The article claims that the process does not need natural gas fuel, but shows the offgas from the H2 purification unit is a "waste gas to fuel". The syngas recovery system does not include a SSH, which is normally associated with export steam.

There is a need for an improved oxygen-fired reforming process that addresses at least some of the above-listed disadvantages of existing systems.

SUMMARY

The present disclosure relates to a process that uses the syngas product from an oxygen-fired reformer to provide all heating duties needed in the reforming process, eliminating the need for a fired heater. Essentially complete CO2 capture is possible due to the elimination of flue gas stream.

The fired heater adds a significant amount of capital cost to an ATR or PDX process, consumes fuel and emits CO2. The CO2 emission from the fired heater can typically range from 5 to 10% of the total CO2 generated in an ATR process and is at low pressure, making it economically impractical to capture this portion of the CO2 from the process. The current invention is based on a realization that the fired heater is not necessary for an ATR or PDX process from the heat balance point of view; the heat required for steam generation and all preheating and heating functions that would conventionally be carried out in the fired heater can be provided entirely by the syngas. This is true especially when there are no nearby industrial processes to purchase export steam. Therefore, the fired heater can be eliminated by shifting those preheating and heating functions from the fired heater to the syngas heat recovery system. Not only does eliminating the fired heater eliminate the fired heater capital cost, fuel consumption and CO2 emission, it also makes the syngas heat recovery more complete, therefore, improving process efficiency considerably.

Aspect 1: A process for producing syngas, the process comprising reacting a reformer feed stream comprising methane and an oxidant selected from the group consisting of water and carbon dioxide with an oxygen-enriched stream to produce a first syngas stream comprising hydrogen, carbon monoxide, and carbon dioxide; heating a preheated mixed feed stream by indirect heat exchange with the first syngas stream to produce the reformer feed stream and a second syngas stream; heating a boiler feed water stream by indirect heat exchange with the second syngas stream to produce a saturated steam and a third syngas stream; and heating the saturated steam by indirect heat exchange with the third syngas stream to produce a superheated steam and a fourth syngas stream.

Aspect 2: A process for producing syngas, the process comprising reacting a reformer feed stream comprising methane and an oxidant selected from the group consisting of water and carbon dioxide with an oxygen-enriched stream to produce a first syngas stream comprising hydrogen, carbon monoxide, and carbon dioxide; heating a preheated mixed feed stream by indirect heat exchange with the first syngas stream and reacting the methane and oxidant in the preheated mixed feed stream to form hydrogen, carbon monoxide, and carbon dioxide to produce the reformer feed stream and a second syngas stream; heating a boiler feed water stream by indirect heat exchange with the second syngas stream to produce a saturated steam and a third syngas stream; and heating the saturated steam by indirect heat exchange with the third syngas stream to produce a superheated steam and a fourth syngas stream.

Aspect 3: A process according to Aspect 1 or Aspect 2, further comprising injecting a process steam into the first syngas stream before transferring heat by indirect heat exchange with the preheated mixed feed stream.

Aspect 4: A process according to any of Aspects 1 to 3, wherein the second syngas stream has a temperature that is greater than 815° C.

Aspect 5: A process according to any of Aspects 1 to 4, wherein the preheated mixed feed stream has a temperature that is less than 455° C.

Aspect 6: A process according to any of Aspects 1 to 5, wherein the saturated steam is heated only by the third syngas stream.

Aspect 7: A process according to any of Aspects 1 to 6, further comprising reacting CO with H2 in the third syngas stream or a stream derived from the third syngas stream to produce a methanated H2 product stream comprising H2 and CH4.

Aspect 8: A process according to any of Aspects 1 to 7, further comprising heating a mixed feed stream by indirect heat exchange with the fourth syngas stream to produce the preheated mixed feed stream and a fifth syngas stream.

Aspect 9: A process according to Aspect 8, wherein the mixed feed stream is heated only by the fourth syngas stream.

Aspect 10: A process according to Aspect 8 or Aspect 9, further comprising combining a CO2-rich stream with the mixed feed stream.

Aspect 11: A process according to any of Aspects 8 to 10, further comprising separating the third syngas stream or a stream derived from the third syngas stream to produce a coldbox tail gas stream and any of a purified CO product, a purified H2 product, and a syngas product; and combining at least 98% of the coldbox tail gas stream with any of the following: the mixed feed stream, the preheated mixed feed stream, the reformer feed stream, the first syngas stream, and a stream derived from the first syngas stream.

Aspect 12: A process according to any of Aspects 8 to 11, further comprising reacting at least a portion of the water with carbon monoxide in the fourth syngas stream to produce hydrogen and carbon dioxide.

Aspect 13: A process according to Aspect 12, wherein a shift steam stream is combined with the fourth syngas stream prior to reacting the at least a portion of water with carbon monoxide.

Aspect 14: A process according to any of Aspects 8 to 13, further comprising the following steps heating a hydrocarbon feedstock stream by indirect heat exchange with the fifth syngas stream or a stream derived from the fifth syngas stream to produce a preheated hydrocarbon feedstock stream; combining the preheated hydrocarbon feedstock stream with a steam feed stream to produce the mixed feed stream; and heating a water stream by indirect heat exchange with the fifth syngas stream or a stream derived from the fifth syngas stream to produce the boiler feed water stream.

Aspect 15: A process according to Aspect 14, further comprising separating one of the fifth syngas stream or a stream derived from the fifth syngas stream into a carbon dioxide-enriched stream and a carbon dioxide-depleted stream; wherein a molar flow rate of carbon dioxide in the carbon dioxide-enriched stream is greater than 95% of a molar flow rate of carbon dioxide in the fifth syngas stream or the stream derived from the fifth syngas stream.

Aspect 16: A process according to any of Aspects 1 to 15, further comprising the steps of separating the fourth syngas stream or a stream derived from the fourth syngas stream into a hydrogen-enriched stream and a hydrogen-depleted stream; and combining at least 98% of the hydrogen-depleted stream with any of the following: the mixed feed stream, the preheated mixed feed stream, the reformer feed stream, the first syngas stream, and a stream derived from the first syngas stream.

Aspect 17: A process according to Aspect 16, further comprising combining a CO2-rich stream with the hydrogen-depleted stream.

Aspect 18: A process according to Aspect 16 or Aspect 17, further comprising dividing a portion of the superheated steam to produce an export steam; wherein a ratio of the mass flow rate of the export steam to the mass flow rate of the hydrogen-enriched stream is less than 60.

Aspect 19: An apparatus for producing syngas, the apparatus comprising an oxygen-fired reformer configured and arranged to react a reformer feed stream with an oxygen-enriched stream to produce a first syngas stream comprising hydrogen, carbon monoxide, and carbon dioxide; a first heat exchanger system for heating a preheated mixed feed stream by indirect heat exchange with the first syngas stream to produce the reformer feed stream and a second syngas stream; a second heat exchanger system for heating a boiler feed water by indirect heat exchange with the second syngas stream to produce a saturated steam and a third syngas stream; and a third heat exchanger system for heating a saturated steam by indirect heat exchange with the third syngas stream to produce a supersaturated steam and a fourth syngas stream.

Aspect 20: An apparatus according to Aspect 19, wherein the first heat exchanger comprises a reforming catalyst in fluid communication with the preheated mixed feed stream.

Aspect 21: An apparatus according to Aspect 19 or Aspect 20, further comprising a fourth heat exchanger system for heating a mixed feed stream by indirect heat exchange with the fourth syngas stream to produce the preheated mixed feed steam and a fifth syngas stream.

Aspect 22: An apparatus according to Aspect 21, further comprising a fifth heat exchanger system for heating a hydrocarbon feedstock stream and a water stream by indirect heat exchange with the fifth syngas stream to produce a preheated hydrocarbon feedstock stream and a boiler feed water stream respectively; and a feed mixing system for the combination of the preheated hydrocarbon feedstock stream and a steam feed stream to produce a mixed feed stream.

Aspect 23: An apparatus according to Aspect 22, further comprising a hydrogen purification system configured and arranged to accept the third syngas stream or a stream derived from the third syngas stream for separating the third syngas stream or a stream derived from the third syngas stream into a hydrogen-enriched stream and a hydrogen-depleted stream; and a tail gas conduit in fluid flow communication with the hydrogen purification system and the feed mixing system for mixing the hydrogen-depleted stream with the preheated hydrocarbon feedstock stream and the steam feed stream.

Aspect 24: An apparatus according to Aspect 22 or Aspect 23, further comprising a product purification system configured and arranged to accept the third syngas stream or a stream derived from the third syngas stream for separating the third syngas stream or a stream derived from the third syngas stream to produce a coldbox tail gas stream and any of a purified CO product, a purified H2 product, and a syngas product; and a coldbox tail gas conduit in fluid flow communication with the hydrogen purification system and the feed mixing system for mixing the coldbox tail gas stream with the preheated hydrocarbon feedstock stream and the steam feed stream.

Aspect 25: An apparatus according to any of Aspects 19 to 24, further comprising a carbon dioxide separation system configured and arranged to accept the third syngas stream or a stream derived from the third syngas stream and produce a carbon dioxide-enriched stream and a carbon dioxide-depleted stream.

Aspect 26: An apparatus according to any of Aspects 19 to 25, further comprising a shift reactor configured and arranged to accept the third syngas stream or a stream derived from the third syngas stream, wherein the shift reactor comprises a shift catalyst for reacting water with carbon dioxide to produce hydrogen and carbon monoxide.

Aspect 27: An apparatus according to any of Aspects 19 to 26, further comprising a methanator configured and arranged to accept the third syngas stream or a stream derived from the third syngas stream for reacting CO2 with H2 in the third syngas stream or a stream derived from the third syngas stream to produce a methanated H2 product stream comprising H2 and CH4.

BRIEF DESCRIPTION OF THE DRAWINGS

The present invention will hereinafter be described in conjunction with the appended figures wherein like numerals denote like elements.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

In the claims, letters may be used to identify claimed method steps (e.g. a, b, and c). These letters are used to aid in referring to the method steps and are not intended to indicate the order in which claimed steps are performed, unless and only to the extent that such order is specifically recited in the claims.

Figure 1A:
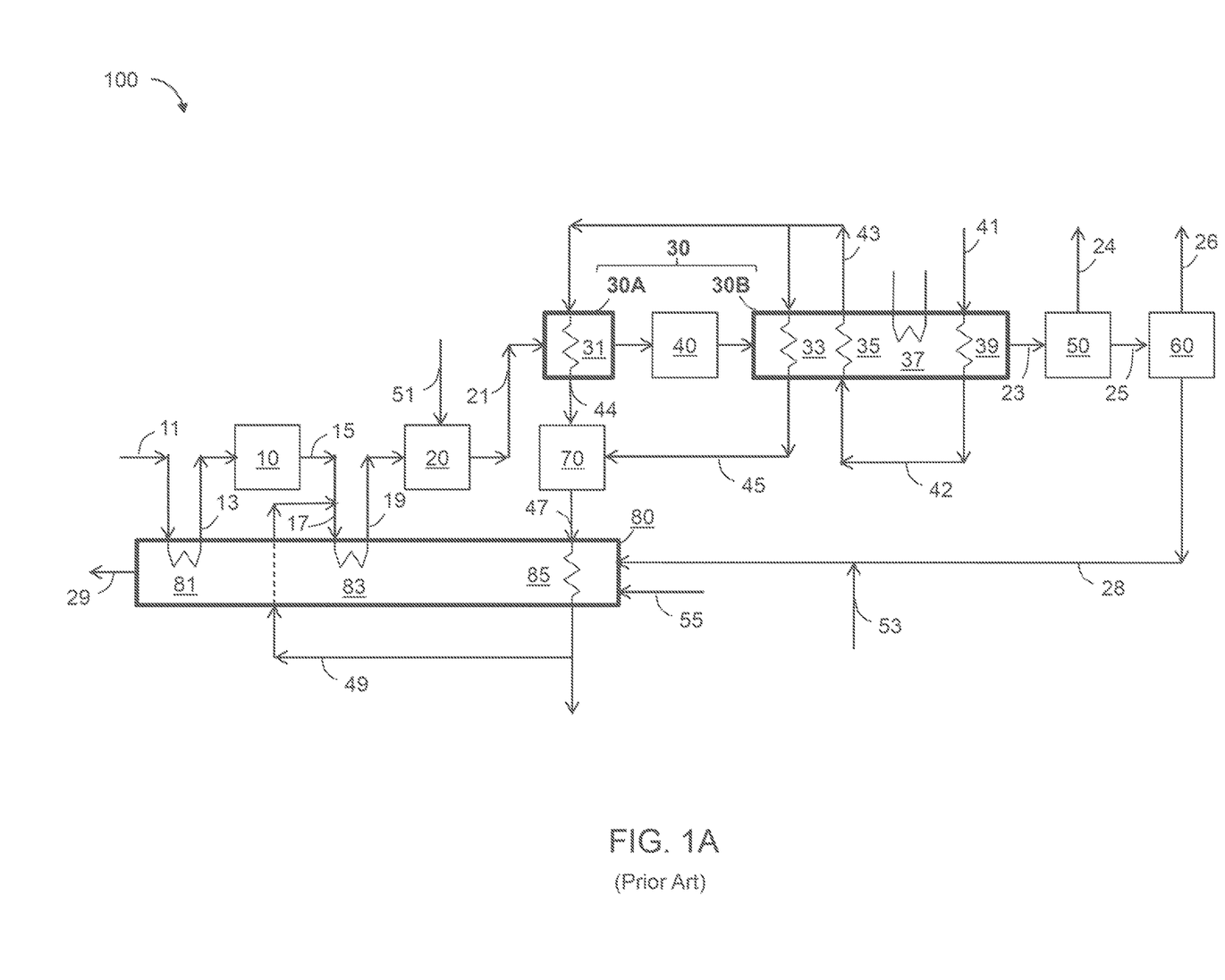
FIG. 1A is a flowsheet schematic depicting a prior art process for H2 production.

FIG. 1A shows a conventional oxygen-fired reforming process 100 that produces H2 from a hydrocarbon feedstock and captures CO2. The two primary industrial applications of oxygen-fired reforming are auto-thermal reforming (ATR) and partial oxidation (PDX). Both ATR and PDX processes are based on an oxygen-fired reformer 20. In the ATR process, this oxygen-fired reformer is called autothermal reformer. It reacts the reformer feed 19 with oxygen-enriched stream 51 in an oxidation section and the reaction products then pass through a bed of reforming catalyst. In the PDX process, this oxygen-fired reformer is a partial oxidation reactor; there is no catalyst bed in this reactor and reforming reactions are carried out thermally. The reformer feed 19 is prepared by preheating a hydrocarbon feedstock 11 (feed preheating or FPH) in a first heating coil 81 in a fired heater 80, removing the sulfur from the preheated feedstock 13 in a hydrodesulfurization unit 10, mixing the desulfurized feedstock 15 with steam feed stream 49 to form a mixed feed 17, preheating the mixed feed in a second heating coil 83 (mixed feed preheating or MFPH) in the fired heater 80 to the temperature required by the oxygen-fired reformer. Optionally (not shown), the preheated mixed feed can go to a prereformer followed by reheating in the fired heater 80 before going to the oxygen-fired reformer 20. The final product of the oxygen-fired reformer is a first syngas stream 21 comprising H2, CO, CO2, CH4 and steam. In a hydrogen production process, the first syngas stream then goes through a syngas heat recovery system 30 consisting of a waste heat boiler 31 to produce steam 44, a boiler 33 downstream of a high-temperature water gas shift (WGS) reactor 40 to produce steam 45, and a heater 35 for preheating boiler feed water stream 42, a heater 37 to provide heat for a carbon dioxide separation system 50, and a heater 39 to preheat boiler feed water stream 41. The preheated boiler feed water stream 43 may then be fed to a deaerator (not shown). The cooled syngas stream 23 from the syngas heat recovery system 30 goes to a gas-liquid separator (not shown) to remove the condensed water in the syngas (process condensate).

The syngas heat recovery system 30 may be a single heat exchanger or be split into two or more heat exchangers in series or parallel. For clarity, the syngas heat recovery system 30 in FIG. 1A is split into two heat exchangers, 30A and 30B. Dividing heat exchanger systems into multiple heat exchangers is typically a tradeoff where efficiency is sacrificed for an advantage such as simplified operation, a smaller heat exchanger system, a simpler design of the heat exchanger system, or the reduction of risk to the process.

The CO2 in the cooled syngas stream 23 may then be removed in a carbon dioxide separation system 50 and recovered as a carbon dioxide-enriched stream 24. A carbon dioxide-depleted syngas stream 25 is fed to a product purification unit 60 to produce a hydrogen-enriched product stream 26. This product purification unit may be a pressure swing absorption (PSA) unit for a H2 production process. A hydrogen-depleted stream 28, also known as tail gas, from the product purification unit is used as the fuel for the fired heater 80. The hydrogen-depleted stream 28, optionally along with a supplementary fuel or trim fuel 53, is combusted in the fired heater 80 with combustion air 55. A flue gas stream 29 is produced from the fired heater and emits $CO_2$.

The steam generated in boilers 31 and 33 is separated from the saturated liquid water in a steam drum 70. The saturated steam 47 from the steam drum is heated in a third heating coil 85 in the fired heater 80. When export steam is a co-product, this steam super heating (SSH) is needed to meet the temperature requirement for the export steam.

High-temperature water gas shift (WGS) reactor 40 may be used to react CO in the raw syngas stream with water to produce more $H_2$. To enhance this shift reaction, additional steam can optionally be introduced to the reactor (not shown). The WGS reaction is exothermic and this heat of reaction is used to produce steam in boiler 33. Optionally, the WGS reactor 40 and boiler 33 can be combined into an isothermal WGS reactor, where the reaction heat is absorbed by the internal cooling tubes to produce steam.

Optionally, the process may have two WGS reactors, one upstream of the heater 35 (i.e., either integrated with the boiler 33 or as a separate WGS reactor 40 as shown in FIG. 1) and the other downstream of the heater 35 (not shown). This two stage WGS arrangement produces more $H_2$ for a given raw syngas stream and reduces CO in the tail gas.

The carbon dioxide separation system 50 can be an amine-based $CO_2$ acid gas removal (AGR) unit. In this case, the heater 37 will be the reboiler of the stripper column in the AGR unit. The heat duty for the reboiler may be supplemented with steam if needed. The carbon dioxide separation system 50 can also be other AGR units based on different solvents. It can also be a vacuum swing adsorption (VSA) based $CO_2$ recovery unit.

Figure 1B:
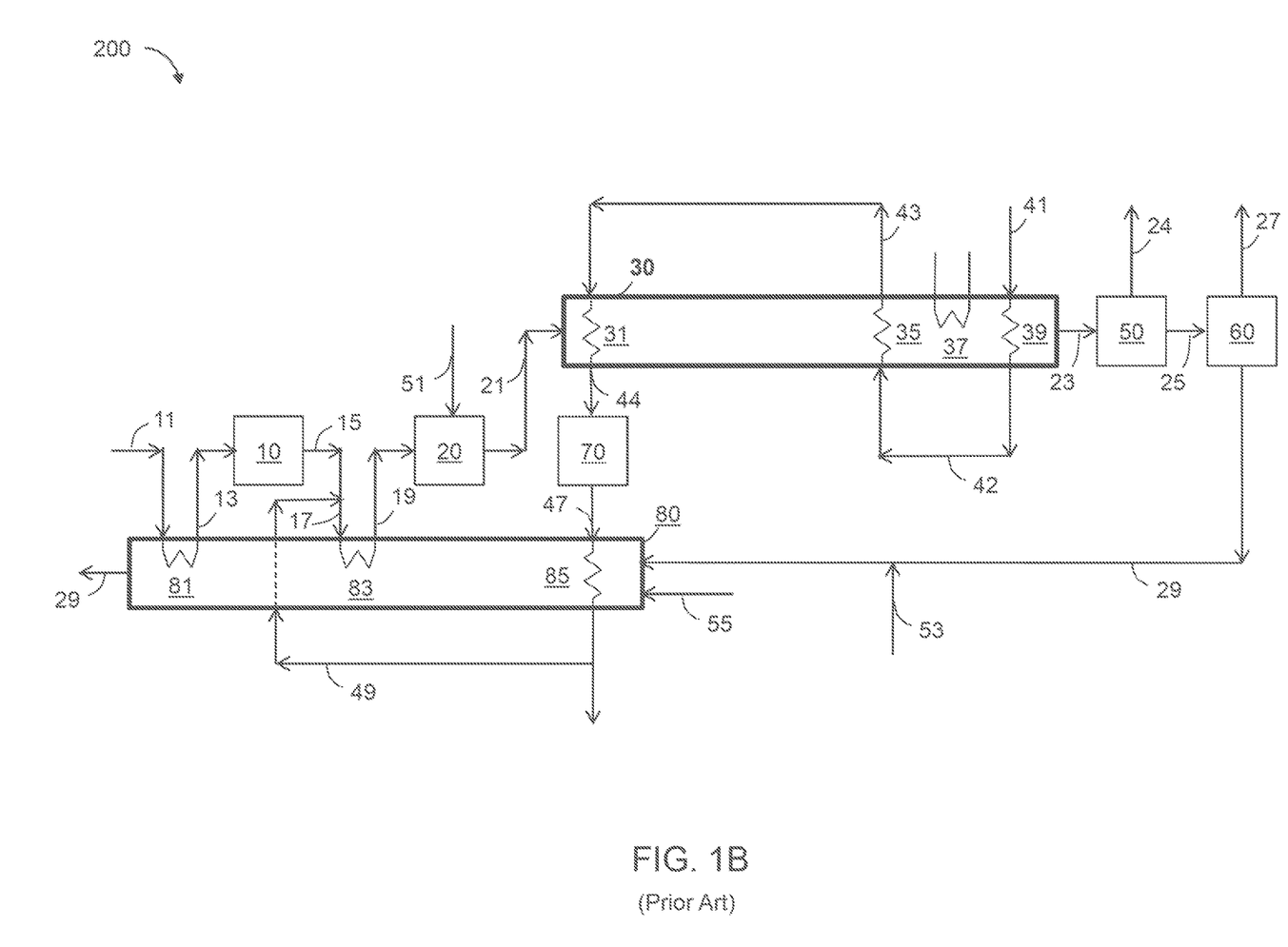
FIG. 1B is a flowsheet schematic depicting a prior art process for syngas production.

FIG. 1B shows a conventional oxygen-fired reforming process 200 that produces syngas (a mixture of CO and $H_2$) from a hydrocarbon feedstock and captures $CO_2$. For a syngas production process, especially with a syngas product of a high $H_2$/CO ratio, the process may not have any WGS reactors, and the associated boiler 33. FIG. 1B shows a syngas heat recovery system 30 as a single network of heat exchangers.

For a syngas production process, the product purification unit 60 is a cryogenic separation unit also known as a "cold box." In this case there may be one or more product streams with any combination of composition ranging from pure $H_2$ to pure CO and any mixture of the two. In FIG. 1B there is a single syngas product 27 shown. Typically there would also be a coldbox tail gas stream 29 comprising $H_2$ and/or CO that cannot be sold and therefore would be combusted in the fired heater 80 with combustion air 55, optionally along with a supplementary fuel or trim fuel 53.

When the end use of the $H_2$ or syngas product is integrated with the ATR or PDX process, such as $H_2$ for ammonia synthesis or syngas for methanol synthesis, the syngas heat recovery system and product purification unit may involve heat exchanging with the streams from these synthesis processes.

Note that several preheating and heating functions in the conventional ATR and PDX processes are carried out in a fired heater 80. These include FPH in first heating coil 81, MFPH in second heating coil 83 and SSH in third heating coil 85. If the process uses a prereformer (not shown), the mixed feed reheating is also normally carried out in a fired heater. In practice, these preheating and heating functions may be carried out in more than one fired heaters.

Figure 2A:
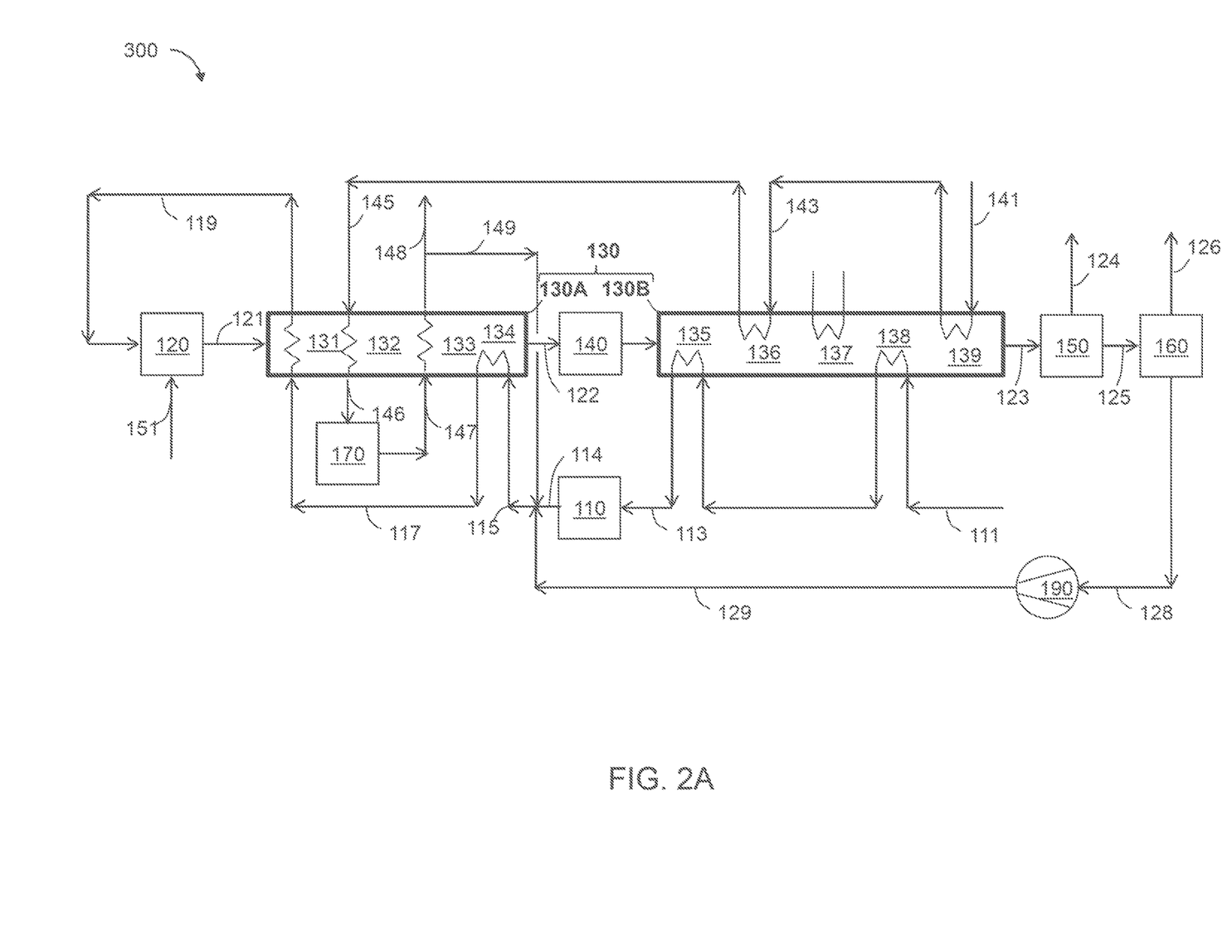
FIG. 2A is a flowsheet schematic depicting an embodiment of a process for H2 production with no fired heater.

FIG. 2A shows a process 300 of the current invention for $H_2$ and export steam production with $CO_2$ capture. At the heart of the process is a oxygen-fired reformer 120. The reformer feed 119 to the reformer is prepared by preheating a hydrocarbon feedstock 111 in two feed preheating (FPH) heat exchangers 138 and 135 in the syngas heat recovery system 130, removing the sulfur from the preheated feedstock 113 in a hydrodesulfurization unit 110, mixing the desulfurized feedstock 114 with steam feed stream 149 to form a mixed feed 115, preheating the mixed feed in a mixed feed preheating (MFPH) heat exchanger 134 in the syngas heat recovery system 130. The preheated mixed feed 117 is introduced to the tube side of a recuperative reformer (RR) 131, where it is further heated and partially reformed. The reformer feed stream 119 is then fed to the oxygen-fired reformer 120, along with oxygen-enriched stream 151. The reformer feed 119 reacts with the oxygen-enriched stream 151 in the oxygen-fired reformer 120 to form a first syngas stream 121 comprising $H_2$, CO, $CO_2$, $CH_4$ and steam. The first syngas stream 121 may be mixed with a process steam, in which the process steam is saturated or superheated, for example if it is desired to increase the ratio of $H_2O$ to CO in the first syngas stream 121. The first syngas stream 121 enters the syngas recovery system 130, first feeding the shell side of the recuperative reformer (RR) 131 to provide heat for the reforming on the tube side by heat transfer through the tubes. The syngas leaving the recuperative reformer (RR) 131 is then fed to a waste heat boiler (WHB) 132 to generate steam 146 from preheated boiler feed water stream 145. The heat in this syngas stream is further recovered in a steam super heating (SSH) heat exchanger 133, a mixed feed preheating (MFPH) heat exchanger 134, a feed preheating (FPH) heat exchanger 135 for a second stage of FPH, a heat exchanger 136 for further heating preheated boiler feed water stream 143, a heat exchanger 137 to provide the heat for the operation of a $CO_2$ recovery/removal unit, a feed preheating (FPH) heat exchanger 138 for a first stage of FPH and a heat exchanger 139 to preheat boiler feed water 141. The preheated boiler feed water 143 may then be fed to a deaerator (not shown). The syngas from heat exchanger 139 may be further cooled in a trim cooler (not shown) and the condensed steam in the syngas (process condensate) is removed in a gas-liquid separator (not shown).

The syngas heat recovery system 130 may be a single heat exchanger or be split into two or more heat exchangers in series or parallel. For clarity, the syngas heat recovery system 130 in FIG. 2A is split into two heat exchangers, 130A and 130B. Dividing heat exchanger systems into multiple heat exchangers is typically a tradeoff where efficiency is sacrificed for an advantage such as simplified operation, a smaller heat exchanger system, a simpler design of the heat exchanger system, or the reduction of risk to the process.

The cooled syngas 123 feeds a carbon dioxide separation system 150 to remove/recover a carbon dioxide-enriched stream 124. A carbon dioxide-depleted syngas 125 then goes to a product purification unit 160. For $H_2$ production, this product purification may be carried out in a pressure swing adsorption unit (PSA), producing a hydrogen-enriched stream 126 and a hydrogen-depleted stream 128, or tail gas, that may be compressed in a compressor 190 and recycled as compressed hydrogen-depleted stream 129. The hydrogen-depleted stream 128 may be recycled to the hydrocarbon feed system of the oxygen-fired reformer between the inlet of the feed preheating (FPH) heat exchanger 138 and the inlet of the recuperative reformer (RR) 131, to the oxygen-fired reformer 120, or to the syngas stream between the oxygen-fired reformer 120 and the water gas shift reactor (WGS) 140. If the hydrogen-depleted stream 128 is sufficiently rich in CO2, it may be combined with the desulfurized feedstock 114 to form the mixed feed 115. All of the hydrogen-depleted stream may be recycled, but in cases where inert gases such as Ar can build up in the system, a purge stream will be required on the hydrogen-depleted stream and at least 98% of the hydrogen-depleted stream may be recycled. The product purification unit 160 may include internal recycle to increase the product recovery.

The oxygen-fired reformer 120 can be an autothermal reformer (ATR) as in the conventional autothermal reforming process 100. In this reformer, the mixed feed and O2 reacts in an oxidation chamber and the reaction products flow through a bed of a reforming catalyst to form the raw syngas stream 121. The oxygen-fired reformer 120 can be a PDX reactor as in the conventional process 100, in which there is no catalyst bed and all reforming reactions are carried out thermally.

The oxygen-enriched stream 151 for the oxygen-fired reformer 120 may be supplied by an air separation unit (ASU), with a typical O2 purity of 99.5%, balanced mostly by Ar.

The steam 146 generated in the waste heat boiler (WHB) 132 is separated from the saturated water in a steam drum 170. A saturated steam 147 from the steam drum is super-heated in the steam super heating (SSH) heat exchanger 133. A portion of the super-heated steam is used as a steam feed stream 149 for the process and another portion is exported as an export steam 148. When the export steam is a co-product, this steam super heating (SSH) heat exchanger 133 heats the steam to the temperature required for the export steam. There is no further heating in a fired heater as in the conventional ATR or PDX process. For a H2 product flow rate of 118,000 Nm3/day, or 0.5 tons/h, the export steam rate may be between 0 and 30 tons/h. This can be expressed as a ratio of the mass flow rate of the export steam to the mass flow rate of the H2 product equal to between 0 and 60.

A water gas shift (WGS) reactor 140 may be used to react CO in the raw syngas stream 122 with water to produce more H2. To enhance this shift reaction, additional steam can optionally be introduced to the reactor (not shown). Optionally, another water gas shift can be included downstream of the feed preheating (FPH) heat exchanger 135 (not shown) or between the heat exchanger 136 when it is broken up into two. A two-stage WGS arrangement produces more H2 for a given raw syngas stream and reduces CO in the tail gas.

The carbon dioxide separation system 150 can be an amine-based acid gas removal (AGR) unit. In this case, the heat exchanger 137 will be the reboiler of the stripper column in the AGR unit. The heat duty for the reboiler may be supplemented with steam if needed. The carbon dioxide separation system 150 can also be other AGR units based on different solvents. It can also be a VSA based CO2 recovery unit.

Carbon dioxide capture can be enhanced by injecting more carbon dioxide into the process upstream of the oxygen-fired reformer 120. Carbon dioxide can partially or completely replace steam in the reforming reaction. The carbon dioxide functions as a an oxidant to react with methane just as steam reacts with methane in steam reforming. Effectively, dry reforming can be thought of as stoichiometrically equivalent to the combination of a steam reforming reaction and a reverse WGS reaction as shown below. In this case, a carbon-dioxide rich stream may be combined with the hydrogen-depleted stream 128 before or after compression, or directly with the mixed feed stream 115, the preheated mixed feed stream 117, or the reformer feed stream 119.

$$CO2+CH4=2H2+2CO \quad \text{(dry reforming)}$$

$$H2O+CH4=3H2+CO \quad \text{(steam reforming)}$$

$$CO2+H2=CO+H2O \quad \text{(reverse WGS)}$$

As shown in FIG. 2A, three preheating functions normally carried out in a fired heater in the conventional ATR or PDX process, namely, FPH, MFPH, and SSH, are shifted in the process of the current invention to the syngas heat recovery system. This shift allows the process to eliminate the fired heater. The main challenge in this shift is how to carry out MFPH in the syngas heat recovery system. In a PDX process, this MFPH may not be necessary, however the RR reduces oxygen usage in the oxygen-fired reformer. In an ATR process, the mixed feed 115 needs to be heated to a high temperature (e.g., 540° C.) in order to feed the oxygen-fired reformer 120. While the first syngas stream 121 contains a lot of heat above that temperature since it leaves the O2-reformer at about 1000° C., a range of the syngas heat (e.g., from about 455° C. to about 700° C.) cannot be used easily without overcoming an equipment erosion process called metal dusting.

Metal dusting is a result of reaction of CO in the syngas with the iron on the surface of heat recovery equipment. The reaction forms iron carbide that flakes off from the metal surface (dusting), eventually leading to equipment failure. Metal dusting occurs most rapidly when the metal temperature is in the metal dusting temperature range (about 455° C. to about 700° C.), limited by thermodynamics and kinetics. Heat recovery from syngas is therefore difficult in the metal dusting temperature range. Conventionally, a waste heat boiler (WHB) is used to recover the syngas heat from its reformer outlet temperature to below 455° C. The boiling will keep the metal temperature of the WHB low (e.g., below 455° C.) to prevent metal dusting, effectively quenching the syngas.

Different types of recuperative reforming technologies have also been developed to use the high-grade syngas heat for reforming. Recuperative reforming occurs in a heat exchanger reformer. The mixed feed is introduced into the tube side of the reformer filled with a reforming catalyst, and the hot syngas will flow to the shell side of the reformer, providing the heat for reforming by heat transfer through the tubes. The reformer feed stream 119 is then fed to the oxygen-fired reformer 120. The syngas stream leaving the recuperative reformer is normally sent to a WHB for further syngas heat recovery until the syngas is cooled below the metal dusting temperature range. The metal dusting issue in RR is mitigated by using metal dusting resistant materials or coatings and controlled process conditions (e.g., maintaining the steam content in the syngas above a certain level, introducing sulfur-containing species into the syngas, etc.).

Recuperative reforming is used in the process shown in FIG. 2A to provide MFPH duty and reduce oxygen demand. The mixed feed 115 is heated by the syngas in mixed feed preheating (MFPH) heat exchanger 134. The syngas to mixed feed preheating (MFPH) heat exchanger 134 is downstream of the WHB and below the metal dusting temperature. The outlet temperature of the preheated mixed feed stream 117 is at 290 to 440 C. This temperature of mixed feed preheating is too low to be directly fed to the oxygen-fired reformer. Instead, it is fed to the recuperative reformer (RR) 131 where it is further heated and partially reformed.

The reformer feed stream 119 leaves the recuperative reformer (RR) 131 at about 540° C. to about 595° C. and is fed to the oxygen-fired reformer. The risk of metal dusting in the recuperative reformer (RR) 131 is mitigated by the conventional methods, which is typically accomplished using metal dusting resistant materials or coatings along with controlled process conditions.

Typically, the temperature on the tube side of a RR for reforming reactions is from about 490° C. to as high as 870° C. This temperature is much higher than the temperature needed for steam generation (e.g., from about 260° C. to about 370° C.). Therefore, recuperative reforming is a more efficient way to utilize high-grade syngas heat than WHB in terms of maximizing the exergy of the process. Based on the approach of maximizing exergy, the size of a RR is normally maximized so that as much syngas heat as possible is used for reforming. In such a design, as high as 30% of the total reforming duty can be performed in a RR. As a result, the temperature of the syngas leaving a RR is relatively low (e.g., from about 540° C. to about 595° C.).

Since the main goal of using recuperative reforming in the current invention is to complete MFPH and prepare the feed for the oxygen-fired reformer, one may also try to minimize the size of RR. While this "mini" RR design loses some exergy, it does not have negative impact on the process thermal efficiency as long as the extra steam production in the waste heat boiler (WHB) 132 can be exported. The mini RR design may also offer the following benefits: 1) lower RR capital cost; 2) more heat to WHB for producing the steam needed for the process (steam for reforming and water gas shift reactions) and for export, if needed; 3) mitigating metal dusting. Metal dusting risk is mitigated because the syngas leaving RR in a mini RR design will be high (e.g., greater than 815° C. compared to the conventional range from 540° C. to 595° C.), making it possible to maintain the metal temperature throughout the RR above the metal dusting temperature. To this end, one may also use a co-current flow design to heat exchange between the inlet mixed feed and the inlet syngas to raise the metal temperature at this coldest end of the RR. The reforming duty of a mini RR can be only ~10% of the total reforming duty, i.e., ~⅓ of that by a conventional RR design.

Note that in the conventional ATR process, a pre-reformer is sometimes used to partially reform the mixed feed 19 and condition it for the oxygen-fired reformer. The pre-reformed mixed feed would then require reheating in the fired heater 80, in FIG. 1, this would occur downstream of heater 83. The RR as shown in FIGS. 2A and 2B also performs this partial reforming function, therefore, obviating the need for a pre-reformer and associated mixed feed reheating.

Figure 2B:
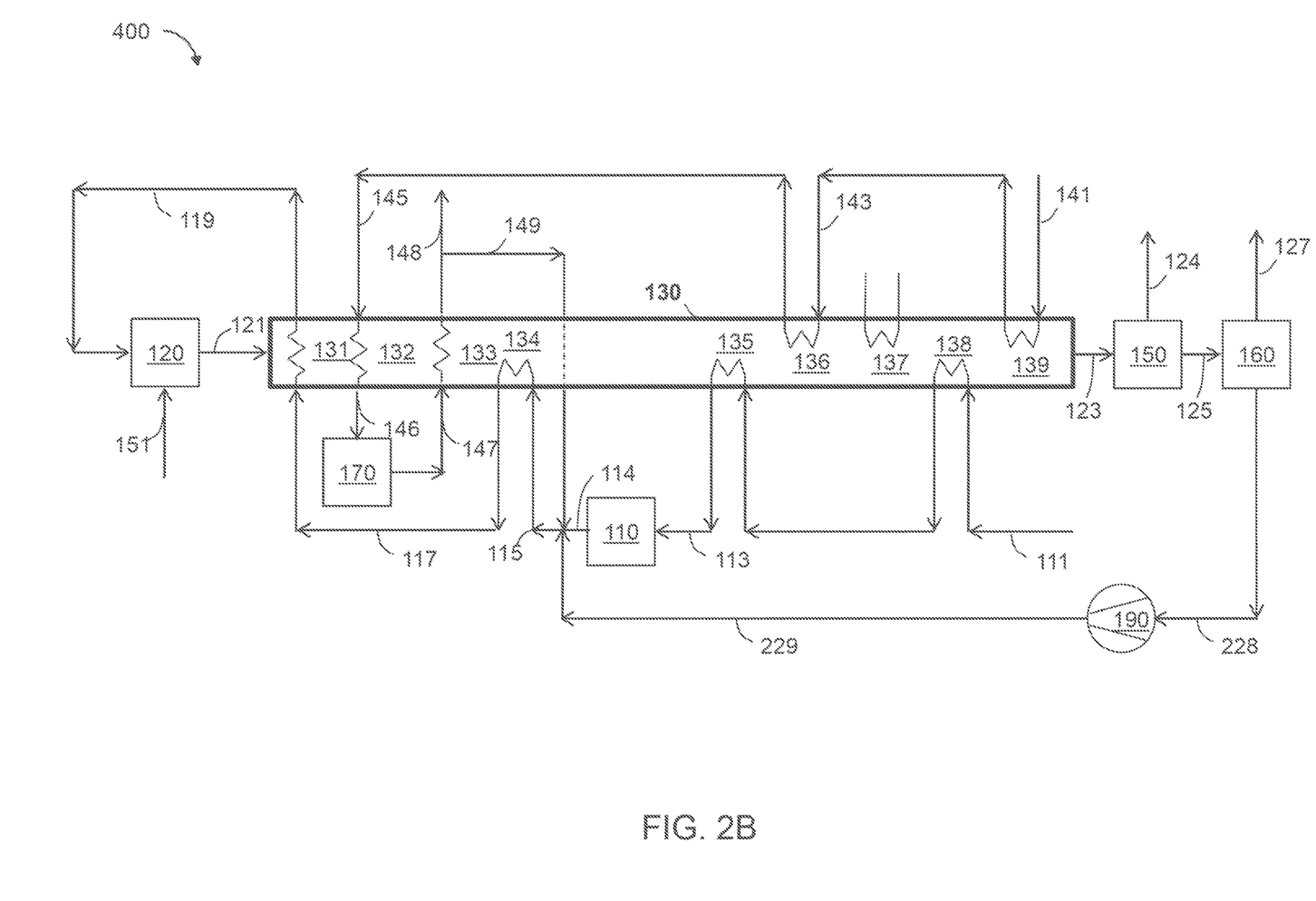
FIG. 2B is a flowsheet schematic depicting an embodiment of a process for syngas production with no fired heater.

The flowsheet shown in FIG. 2B shows an embodiment of the process 400 for syngas and export steam production. The process may not include any WGS reactor if the desired combination of H2, CO, and/or syngas products has a H2/CO ratio equal to or less than the H2/CO ratio in the first syngas stream. FIG. 2B shows the process with no WGS reactor and the syngas heat recovery system 130 as a single heat exchanger.

As was the case in FIG. 1B, the product purification unit 60 is a cryogenic separation unit, or cold box. There may be one or more product streams with any combination of composition ranging from pure H2 to pure CO and any mixture of the two. In FIG. 2B there is a single syngas product 127 shown. Typically there would also be a coldbox tail gas stream 228 comprising H2 and/or CO that cannot be sold and therefore may be compressed in a compressor 190 and recycled. The compressed coldbox tail gas stream 229 may be recycled to the hydrocarbon feed system of the oxygen-fired reformer between the inlet of the 1st stage of feed preheating (FPH) heat exchanger 138 and the inlet of the recuperative reformer (RR) 131, to the oxygen-fired reformer 120, or to the first syngas stream 121. The coldbox tail gas stream 229 comprises CO with essentially no CH4, and therefore is preferably recycled to the first syngas stream 121 or any other syngas stream upstream of the water gas shift (WGS) reactor 140.

When it is acceptable by the end use, the product purification unit 160 may be a methanation reactor (methanator) where the CO in the syngas reacts with H2 to form CH4, resulting in a product stream containing H2 and a small amount of CH4 (e.g., less than 5 mol %), and free of CO. The methanator operates at elevated temperatures (e.g., greater than 260° C.). The feed syngas to the methanator can be heated by its effluent in a heat exchanger. The effluent from the heat exchanger will be cooled to condense out the water formed in the methanator. No recycle is needed when methanation is used at the back end of the process When the end use of the H2 or syngas product is integrated with the ATR or PDX process, such as H2 for ammonia synthesis or syngas for methanol synthesis, the syngas heat recovery system and product purification unit may involve heat exchanging with the streams from these synthesis processes.

The processes in FIGS. 2A and 2B improve on the carbon capture potential of the conventional ATR or PDX process by eliminating the fired heater. The fired heater adds a significant amount of capital cost to an ATR or PDX process, consumes fuel and emits CO2. The CO2 emission from the fired heater can typically range from 5 to 10% of the total CO2 generated in an ATR process and is at low pressure, making it economically impractical to capture this portion of the CO2 from the process. The current invention is made possible after finding that the fired heater is not necessary to close the heat balance; the heat required for steam generation and all preheating and heating functions that would conventionally be carried out in the fired heater can be provided entirely from the syngas. This is true especially when the demand on the export steam is not high. Therefore, the fired heater can be eliminated by shifting those preheating and heating functions from the fired heater to the syngas heat recovery system. Not only does eliminating the fired heater eliminate the fired heater capital cost, fuel consumption and CO2 emission, it also increases the amount of syngas heat recovery, therefore improving process efficiency considerably.

The elimination of the fired heater in the present invention also results in recycling the tail gas from the product purification unit to the feed system for the reformer or the syngas stream. Recycling the tail gas eliminates another source of CO2 emissions in the conventional process, in which combustion of the tail gas in the fired heater leads to more CO2 in the flue gas.

EXAMPLE

While the principles of the invention have been described above in connection with preferred embodiments, it is to be clearly understood that this description is made only by way of example and not as a limitation of the scope of the invention.

The embodiments of both the prior art ATR process 100 in FIG. 1A and the ATR process 300 in FIG. 2A were analyzed using the commerically available Aspen™ process modeling software. Both cases are designed to produce 118,000 Nm3/day H2 (0.5 ton/h) and 1.2 ton/h of steam. Table 1 shows the consumption of feed and fuel, oxygen, and power normalized to the conventional case. The feed and fuel consumption, natural gas in the current example, in the current invention is significantly lower and the current invention emits zero CO2, compared with conventional processes ranging from 85-97% capture. The O2 and power consumption in the current invention (FIG. 2A) are greater than those in the conventional process (FIG. 1A) due to tail gas recycle, which both requires compression and increases the oxygen demand in the oxygen-fired reformer. These costs are outweighed by the benefit of the elimination of a source of CO2 emissions in the flue gas of the conventional process in FIG. 1A. Carbon capture in the flue gas of a conventional fired heater to bring the conventional process to zero CO2 emissions would require a dedicated CO2 capture unit with even higher power consumption due to the low partial pressure of CO2 in the flue gas compared to the syngas.

TABLE 1

| Relative performance | Conventional process (FIG. 1A) | Current invention (FIG. 2A) |
| --- | --- | --- |
| Natural gas consumption | 100 | 96 |
| O2 consumption | 100 | 107.5 |
| Power consumption | 100 | 120 |
| CO2 emission (kg CO2/kg H2) | 0.3 | 0 |

We claim:

1. An apparatus for producing syngas, the apparatus comprising:
    an oxygen-fired reformer configured and arranged to react a reformer feed stream with an oxygen-enriched stream to produce a first syngas stream comprising hydrogen, carbon monoxide, and carbon dioxide;
    a first heat exchanger system for heating a preheated mixed feed stream by indirect heat exchange with the first syngas stream to produce the reformer feed stream and a second syngas stream;
    a second heat exchanger system for heating a boiler feed water by indirect heat exchange with the second syngas stream to produce a saturated steam and a third syngas stream; and
    a third heat exchanger system for heating a saturated steam by indirect heat exchange with the third syngas stream to produce a supersaturated steam and a fourth syngas stream.

2. The apparatus of claim 1, wherein the first heat exchanger system comprises a reforming catalyst in fluid communication with the preheated mixed feed stream.

3. The apparatus of claim 1, further comprising a fourth heat exchanger system for heating a mixed feed stream by indirect heat exchange with the fourth syngas stream to produce the preheated mixed feed steam and a fifth syngas stream.

4. The apparatus of claim 3, further comprising a fifth heat exchanger system for heating a hydrocarbon feedstock stream and a water stream by indirect heat exchange with the fifth syngas stream to produce a preheated hydrocarbon feedstock stream and a boiler feed water stream respectively; and
    a feed mixing system for the combination of the preheated hydrocarbon feedstock stream and a steam feed stream to produce a mixed feed stream.

5. The apparatus of claim 4, further comprising a hydrogen purification system configured and arranged to accept the third syngas stream or a stream derived from the third syngas stream for separating the third syngas stream or a stream derived from the third syngas stream into a hydrogen-enriched stream and a hydrogen-depleted stream; and
    a tail gas conduit in fluid flow communication with the hydrogen purification system and the feed mixing system for mixing the hydrogen-depleted stream with the preheated hydrocarbon feedstock stream and the steam feed stream.

6. The apparatus of claim 5, further comprising a product purification system configured and arranged to accept the third syngas stream or a stream derived from the third syngas stream for separating the third syngas stream or a stream derived from the third syngas stream to produce a coldbox tail gas stream and any of a purified CO product, a purified H2 product, and a syngas product; and a coldbox tail gas conduit in fluid flow communication with the hydrogen purification system and the feed mixing system for mixing the coldbox tail gas stream with the preheated hydrocarbon feedstock stream and the steam feed stream.

7. The apparatus of claim 1, further comprising a carbon dioxide separation system configured and arranged to accept the third syngas stream or a stream derived from the third syngas stream and produce a carbon dioxide-enriched stream and a carbon dioxide-depleted stream.

8. The apparatus of claim 1, further comprising a shift reactor configured and arranged to accept the third syngas stream or a stream derived from the third syngas stream, wherein the shift reactor comprises a shift catalyst for reacting water with carbon dioxide to produce hydrogen and carbon monoxide.

9. The apparatus of claim 1, further comprising a methanator configured and arranged to accept the third syngas stream or a stream derived from the third syngas stream for reacting CO2 with H2 in the third syngas stream or a stream derived from the third syngas stream to produce a methanated H2 product stream comprising H2 and CH4.

* * * * *